US006469974B1

(12) United States Patent
Kaneko

(10) Patent No.: US 6,469,974 B1
(45) Date of Patent: Oct. 22, 2002

(54) RECORD PLAYER

(75) Inventor: Hisao Kaneko, Tokyo (JP)

(73) Assignee: Vestax Corporation, Tokyo (JP)

( * ) Notice: Subject to any disclaimer, the term of this patent is extended or adjusted under 35 U.S.C. 154(b) by 0 days.

(21) Appl. No.: 09/482,349

(22) Filed: Jan. 14, 2000

(30) Foreign Application Priority Data

Jan. 14, 1999 (JP) ............................................ 11-043617

(51) Int. Cl.[7] .................. G11B 003/09; G11B 003/095; G11B 003/10
(52) U.S. Cl. ...................................... 369/127; 369/244
(58) Field of Search ................................ 369/127, 131, 369/136, 158, 165, 173, 68, 181, 202, 245, 244, 222; 84/636, 609

(56) References Cited

U.S. PATENT DOCUMENTS

| | | | | | |
|---|---|---|---|---|---|
| 2,631,858 A | * | 3/1953 | Carlson | ...................... | 369/173 |
| 2,884,256 A | * | 4/1959 | Proctor | ...................... | 369/245 |
| 3,622,163 A | * | 11/1971 | Bachman | ..................... | 708/270 |
| 4,077,635 A | * | 3/1978 | Valere | .......................... | 369/40 |
| 4,105,212 A | * | 8/1978 | Ogura | ......................... | 369/173 |
| 4,106,775 A | * | 8/1978 | Takizawa | .................... | 369/216 |
| 4,148,492 A | * | 4/1979 | Bachelet | .................... | 369/226 |
| 4,153,256 A | * | 5/1979 | Guha | ......................... | 369/250 |
| 4,174,841 A | * | 11/1979 | Cousin | .................... | 324/207.2 |
| 4,187,395 A | * | 2/1980 | Hewson, Jr. | ..................... | 369/5 |
| 4,261,580 A | * | 4/1981 | Tsukagoshi | ................ | 369/158 |
| 4,300,225 A | * | 11/1981 | Lambi | .......................... | 369/2 |
| D275,674 S | * | 9/1984 | Marino | ........................ | D14/17 |
| 4,497,053 A | * | 1/1985 | Wolff | .......................... | 369/244 |
| 4,539,672 A | * | 9/1985 | Einhaus | ....................... | 369/244 |
| 5,350,882 A | * | 9/1994 | Koguchi et al. | .............. | 84/636 |
| 5,353,275 A | * | 10/1994 | Almonte | ..................... | 369/189 |
| D433,011 S | * | 10/2000 | O'Donnell et al. | ........ | D14/202 |
| 6,232,539 B1 | * | 5/2001 | Lonney et al. | ................ | 84/609 |

FOREIGN PATENT DOCUMENTS

| | | | |
|---|---|---|---|
| EP | 1020849 A2 | * | 1/2000 |
| JP | 405158480 A | * | 6/1993 |
| JP | 405158481 A | * | 6/1993 |
| JP | 410199126 A | * | 7/1998 |
| WO | WO9701168 | * | 1/1997 |
| WO | WO0021090 | * | 4/2000 |

* cited by examiner

*Primary Examiner*—William Klimowicz
(74) *Attorney, Agent, or Firm*—Sughrue Mion, PLLC

(57) ABSTRACT

A record player suitable for a so-called scratch performance operation by which a phonograph record is directly rotated in forward and reverse direction to output new artificial sound by fingering of an operator is provided. The positional relationship between the record groove on the turntable and the supporting point P of the arm shaft is defined so as to suppress inward and outward component forces applied to the needlepoint of the cartridge as possible. Three points including a start point and an end point of the record groove on a straight line extending from the rotating shaft core of the turntable in a radial pattern and a rotation center of a tone arm, namely, the supporting point may form an isosceles triangle with the supporting point as an apex.

13 Claims, 8 Drawing Sheets

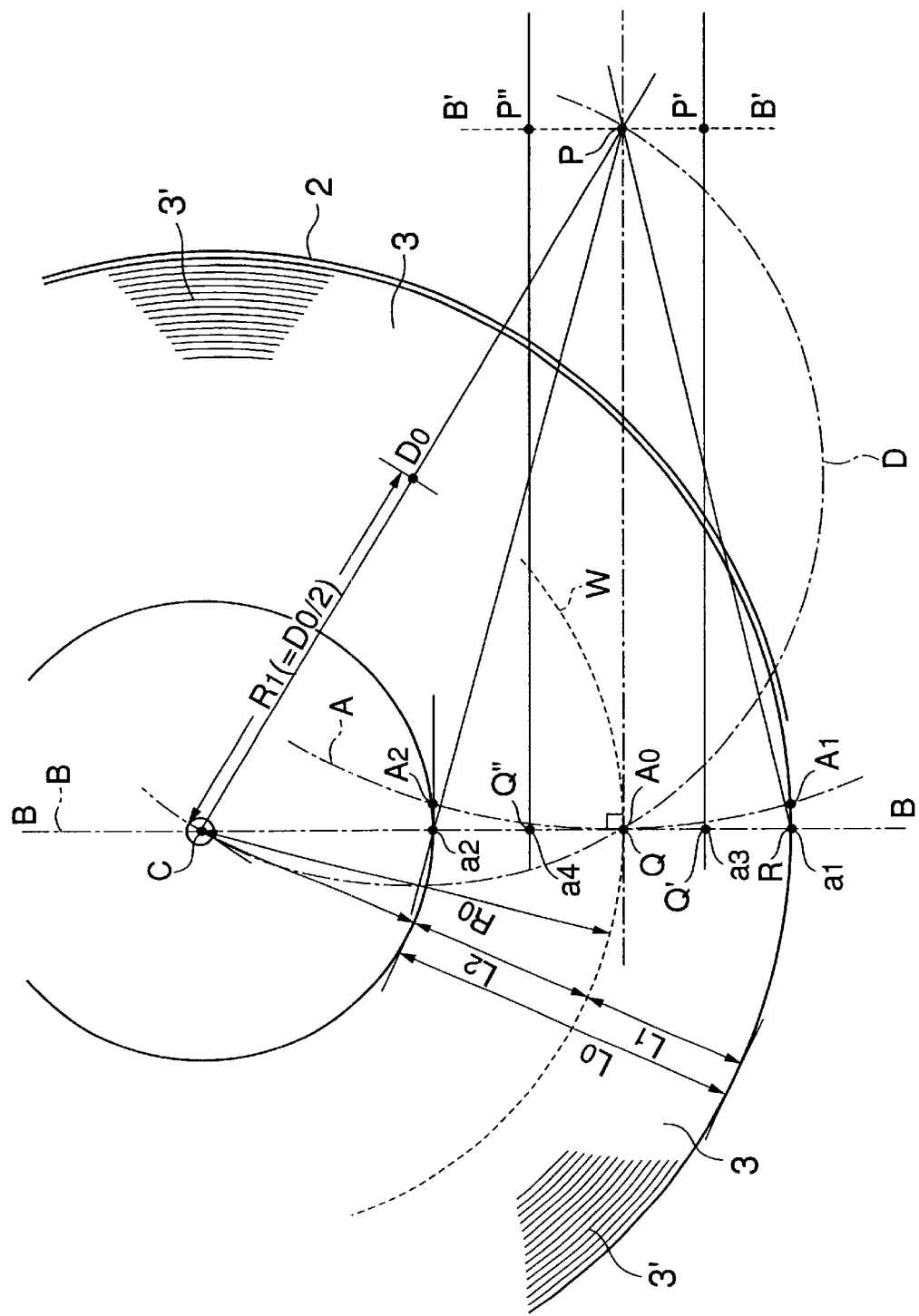

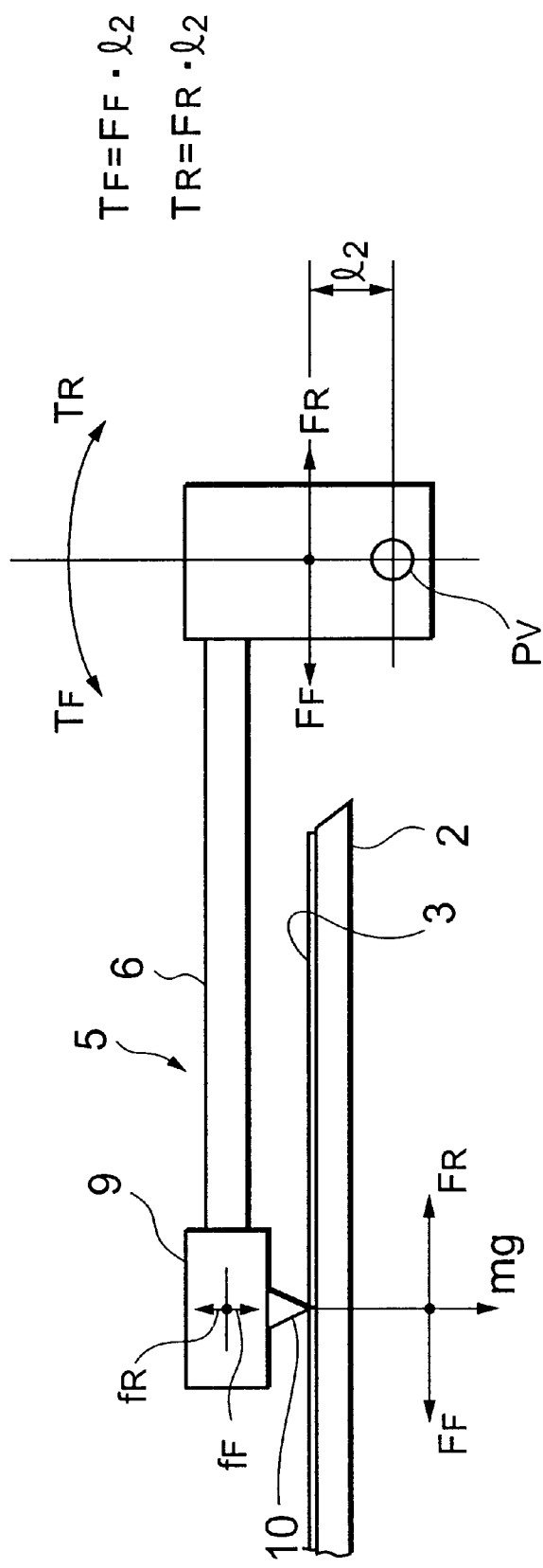

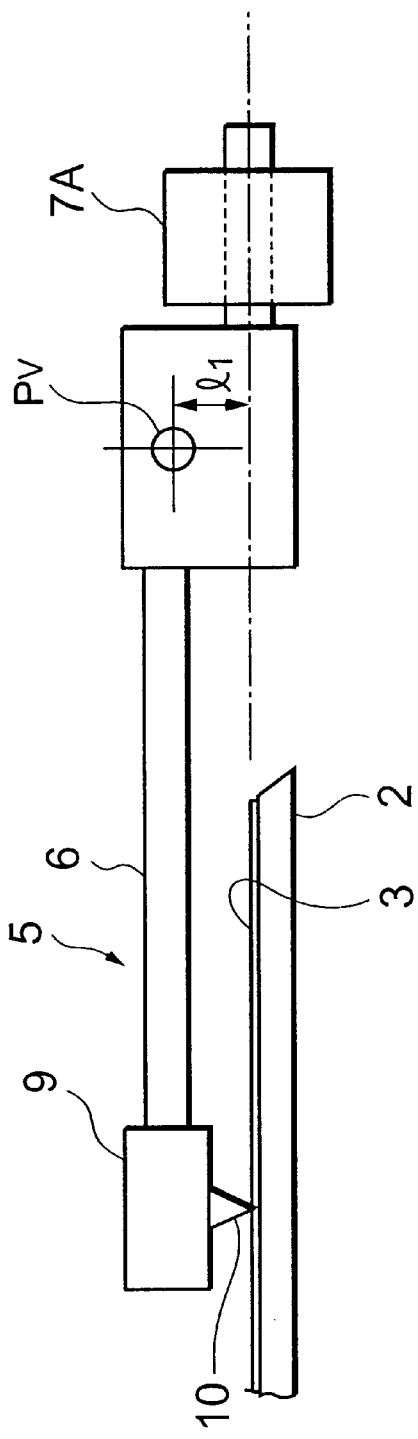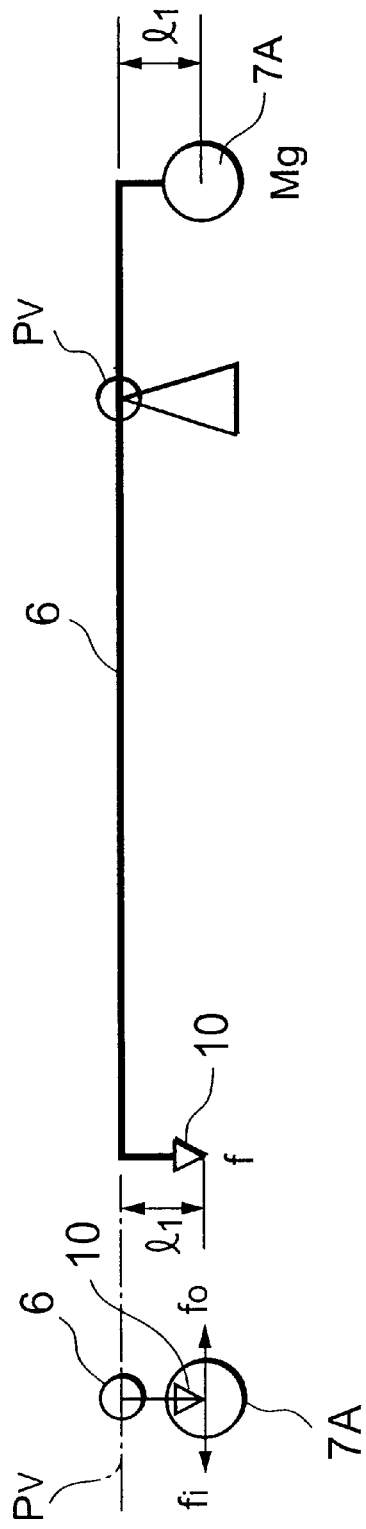

RECORD PLAYER

BACKGROUND OF THE INVENTION

1. Field of the Invention

The present invention relates to a record player used for, e.g., a disc jockey (which will be simply referred to as DJ hereinafter), and more particularly to a record player suitable for a so-called scratch performance operation by which a phonograph record is directly rotated in forward and reverse directions to output sounds by fingering of an operator which is a kind of DJ performance pattern.

2. Description of the Prior Art

FIG. 1 is an operation explanatory drawing showing an operation state of a scratch performance using a conventionally known record player. A record player 1 has been conventionally used as means for reproducing information recorded on a phonograph record. In recent years, however, a scratch performance for creating artificial novel sound information through a cartridge 9 by directly artificially carrying out forward/reverse rotation of a phonograph record 3 with fingertips has been performed as a DJ performance pattern. In this case, the record player is used as means for mixing the sound information from the record player with the counterpart from other various attached sound sources to create a novel world of sound sources. That is, the record player 1 is used as if it is a single musical instrument.

FIGS. 2(A) and (B) are operation explanately drawings when using a prior art record player 1 for HiFi audio as such a scratch performance. FIG. 2(A) shows the operation when forwardly rotating a phonograph record 3 mounted on a turntable 2, and FIG. 2(B) illustrates the operation when inversely rotating the same. In these drawings, a direction of a needle pressure (stylus force) applied to a needlepoint 10 of each cartridge 9 is shown by a vector. Further, a tone arm 5 is made up of an arm shaft 6 and the cartridge 9.

Since the record player 1 which is widely used for DJ for the present has been essentially developed for the HiFi audio, it is designed in such a manner that the acousticity becomes optimum when used with the forward rotation in FIG. 2(A). Therefore, the arm shaft 6 of the tone arm 5 is held so as to be capable of swiveling in the horizontal direction by a vertical rotating shaft core (supporting point, rotating axis) P provided to a pivot portion 8 and the arm shaft 6 is curved in the form of S. That is, an offset angle $\alpha$ (it is generally 21.4°) is formed between an axial line direction 6' of the arm shaft 6 and an axial direction 9' of the cartridge 9 to inwardly bend the cartridge 9 so that a tracking error is compensated. Further, the arm shaft 6 is elongated to the side of the supporting point P and a needle pressure adjuster 7 is provided to the elongation so that reproduction is carried out with the optimum needle pressure.

In case of the DJ scratch performance, however, both a rotational speed number of revolutions and a direction of rotation arbitrarily vary as shown in FIGS. 2(A) and (B). At that time, the force applied to the needlepoint 10 of the cartridge 9 becomes a force F in the tangential direction in the forward rotation as shown in FIG. 2(A) while the same becomes a force F' in a tangential direction in the reverse direction as shown in FIG. 2(B). In regard to magnitudes of the respective forces F and F', these forces can be divided into component forces $F_2$ and $F'_2$ in the X-axis direction which are respectively straight lines connecting the supporting point P and the needlepoint 10 and the counterparts $F_1$ and $F'_1$ in the Y-axis direction which are vertical to the former forces.

In case of the forward rotation, a needle pressure $F_1$ along the internal diameter direction of the phonograph record 3 is constantly applied to the needlepoint 10 during tracking as shown in FIG. 2(A). Further, in case of the reverse rotation, a needle pressure $F'_1$ in the external diameter direction which is completely opposed to the former is applied. Therefore, when the phonograph record 3 is rotated in the forward/reverse direction in the scratch performance, the forces $F_1$ and $F'_1$ in the directions of the internal and external diameters are repeatedly applied to the needlepoint 10. When these forces $F_1$ and $F'_1$ become large and exceed a given frictional force to jut out from a record groove, the needlepoint 10 skips from the groove and a so-called "needle skip phenomenon" occurs. In this case, a turbulence is generated in an output sound, which makes an audience uncomfortable.

Thus, despite of the recent increase in number of DJ performance wishers, the performance technique requiring the considerable skills is needed for changing between the forward rotation and the reverse rotation of the phonograph record 3 at high speed while preventing the needle skip from occurring. Accordingly, a number of performers is not increased in spite of a significant number of performance wishers. Naturally, this is also responsible for limiting pervasion of sound associated devices used together with the record player 1.

SUMMARY OF THE INVENTION

In view of the above-described problems, it is an object of the present invention to provide a record player which can avoid a needle skip phenomenon by suppressing inward and outward component forces applied to a needlepoint of a cartridge as possible when rapidly changing a rotating direction of a phonograph record to a forward direction and a reverse direction by a scratch performance operation and which can be satisfactorily used by an unskilled performer without being restricted to a practiced hand.

According to the present invention, the object can be attained by a record player for a disc jockey which can be adapted to a scratch performance operation for outputting a sound by directly rotating a phonograph record in forward and reverse directions by a finger operation of an operator, comprising: a turntable driven to rotate around a rotating shaft core C; an arm shaft which is supported so as to be capable of swiveling in a horizontal direction around a rotating shaft core P positioned outside the turntable and which is positioned on a straight line connecting the rotating shaft core P and a needle tracking a record groove of a phonograph record as viewed from a plane; and a cartridge which is held at a swiveling end of the arm shaft and detects a sound signal by the needle tracking the record groove of the phonograph record, the rotating shaft core P of the arm shaft being positioned on a straight line orthogonal to a straight line running through the rotating shaft core C of the turntable in the vicinity of the midpoint of an effective width $a_1 a_2$ of the record groove.

According to the present invention, in order to suppress the needle skip caused when forwardly/inversely rotating the phonograph record by the finger operation, the positional relationship between the record groove on the turntable and the supporting point P of the arm shaft is defined so as to suppress inward and outward component forces applied to the needlepoint of the cartridge as possible. Therefore, three points, i.e., a start point R and an end point S of the record groove on a straight line B extending from the rotating shaft core C of the turntable in a radial pattern and a rotation center of a tone arm (rotating shaft core), namely, the supporting point P may form an isosceles triangle with the point P as an apex in a most preferable mode for embodying the present invention in theory. Further, when a straight line PQ connecting an intersection Q and the supporting point P is positioned on a straight line which extends through the intersection Q and is orthogonal to the straight line B or on a parallel line close to this straight line, the supporting point P may be arranged adjacent to or apart from the turntable.

A sliding sheet is intervened between the phonograph record and the turntable so that only the phonograph record can be inversely rotated by using fingertips while rotating the turntable in the forward direction with a fixed rotational speed. At this time, the phonograph record can be slid on the sliding sheet or the phonograph record and the sliding sheet can be slid on the turntable. It is to be noted that both the phonograph record and the turntable may be rotated in the reverse direction by using the fingertips.

When the rotating shaft core P of the arm shaft is positioned on a straight line which is orthogonal to the straight line B running through the rotating shaft core C of the turntable and which runs between points $a_3$ and $a_4$ for dividing the effective width $a_1a_2$ of the record groove into substantially quarters together with the intermediate point Q, the sufficient advantage can be obtained.

The rotating shaft core P of the arm shaft may be determined as follows. That is, the rotating shaft core P is determined on a straight line, which runs through the intersection Q of a first virtual circle W having a distance $R_0$ from the rotating shaft core C of the turntable to the intermediate point Q of the effective width $a_1a_2$ as a radius and a second virtual circle D having a distance $D_0$ between the respective rotating shaft cores C and P of the turntable and the arm shaft as a diameter, and which is orthogonal to the straight line B running through the rotating shaft core C of the turntable.

Most preferably, the start point R and the end point S of the record groove on the straight line B and the rotating shaft core P form an isosceles triangle with the rotating shaft core P as an apex. It is preferable that the rotating shaft core P is distanced away from the intersection Q as far as possible. In other words, the arm shaft is sufficiently lengthened. By doing so, the tracking error can be minimized at the start and end points R and S of the record groove. Extending the arm shaft toward the rotating shaft core P and providing a needle pressure adjuster on the extended portion can be favorable for adjusting the needle pressure.

In addition, when a horizontal rotating shaft core Pv allowing the arm shaft to rotate in the vertical direction is provided at a position above the top surface of the phonograph record, the needle pressure during the reverse rotation of the phonograph record can be larger than that during the forward rotation as will be described later, thereby further enhancing the efficacy for avoiding the needle skip during the reverse rotation. Incidentally, the needle pressure during the reverse rotation can be further increased as the distance from the needlepoint to the rotating shaft core Pv becomes smaller, namely, the length of the arm shaft becomes smaller. On the other hand, it is desirable to set the rotating shaft core P allowing the horizontal rotation away from the turntable as far as possible. In order to satisfy these requirements, S therefore, the horizontal rotating shaft core Pv allowing the vertical swiveling can be biased toward the cartridge away from the vertical rotating shaft core P allowing the horizontal swiveling.

Moreover, the needle pressure adjuster may be a dead weight whose center of gravity is positioned below the rotating shaft core Pv. In such a case, since both the needlepoint and (the center of gravity of) the dead weight provided on the both sides of the rotating shaft core Pv are positioned below the rotating shaft core Pv, a balance can be kept in the form of a needle thread take up (balancing toy). Therefore, although a side force applied to the needlepoint acts so as to oscillate the dead weight in the right-and-left direction (direction orthogonal to the arm shaft), this oscillation can be suppressed by a weight of the dead weight. Consequently, the side force generated to the needlepoint when changing the forward/reverse rotation can be suppressed, thereby further enhancing the effect for avoiding the needle skip.

BRIEF DESCRIPTION OF THE DRAWINGS

FIG. 4 is a layout explanatory drawing of a turntable and a tone arm in the first embodiment;

FIG. 7 is a view showing a comparative example; and

FIG. 8(A)–FIG. 8(C) are views explaining still another embodiment.

DESCRIPTION OF THE PREFERRED EMBODIMENTS

Figure 3A:
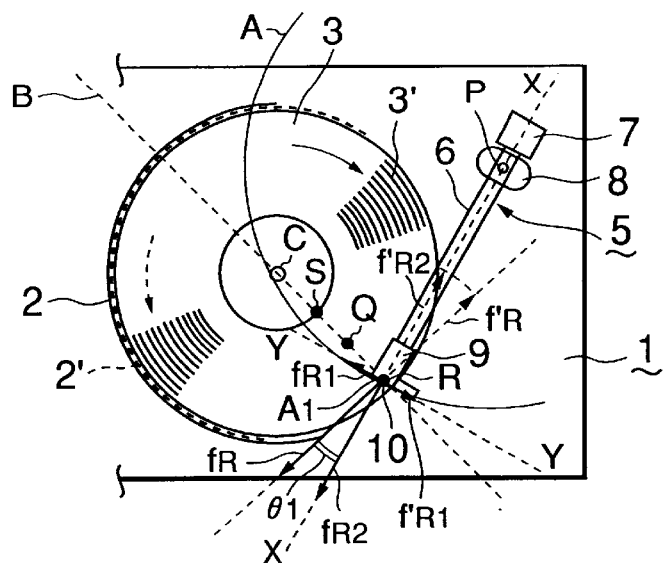
FIG. 3(A)–FIG 3(C) are structure explanatory drawings showing record players according to a first embodiment.
Figure 3B:
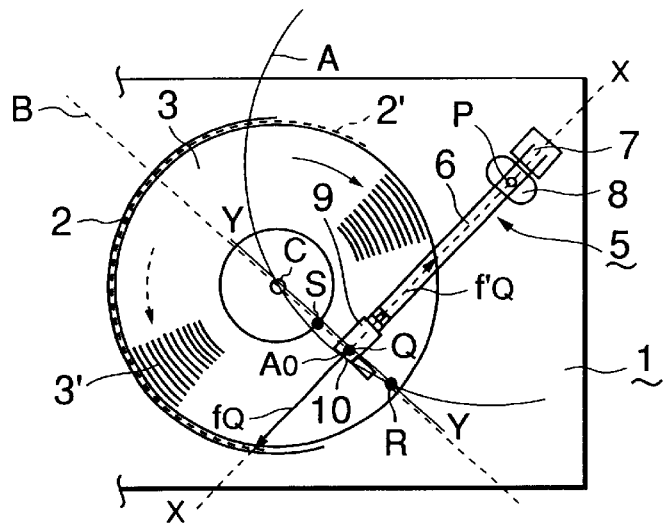
Figure 3C:
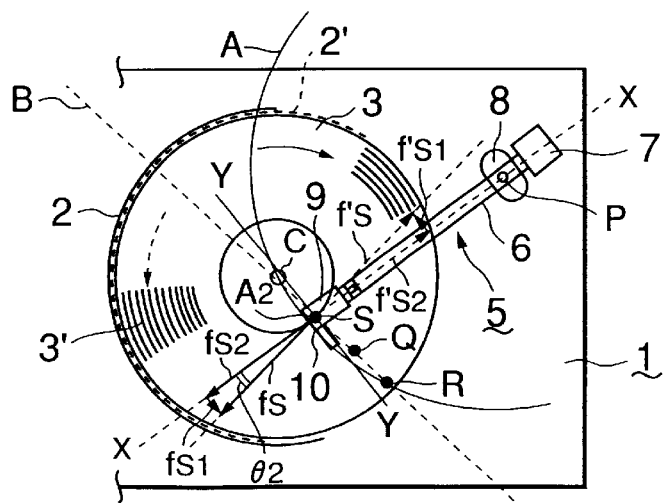

FIG. 3 is explanatory drawings showing a layout and an operation state of a turntable 2 and a tone arm 5 in a record player 1 according to the present invention. FIG. 3A illustrates a state where the tone arm 5 is positioned at a start point R of a record groove 3'; FIG. 3B, a state where the tone arm 5 is positioned at a substantial intermediate point Q of the record groove; and FIG. 3C, a state where the tone arm 5 is positioned at an end point S of the record groove. In these drawings, a force acting on a needle point 10 during forward rotating (indicated by a solid line arrow) of the turntable 2 is indicated by a solid line and a force acting on the needlepoint 10 during reverse rotation (indicated by a broken line arrow) is represented by a broken line in the form of vectors.

In the record player 1 according to this embodiment, the respective functions of the turntable 2, the tone arm 5, a needle pressure adjuster 7, a cartridge 9, the needlepoint 10 and others are substantially equal to those in the player for HiFi audio, but there are characteristic differences in structure between them.

Figure 1:
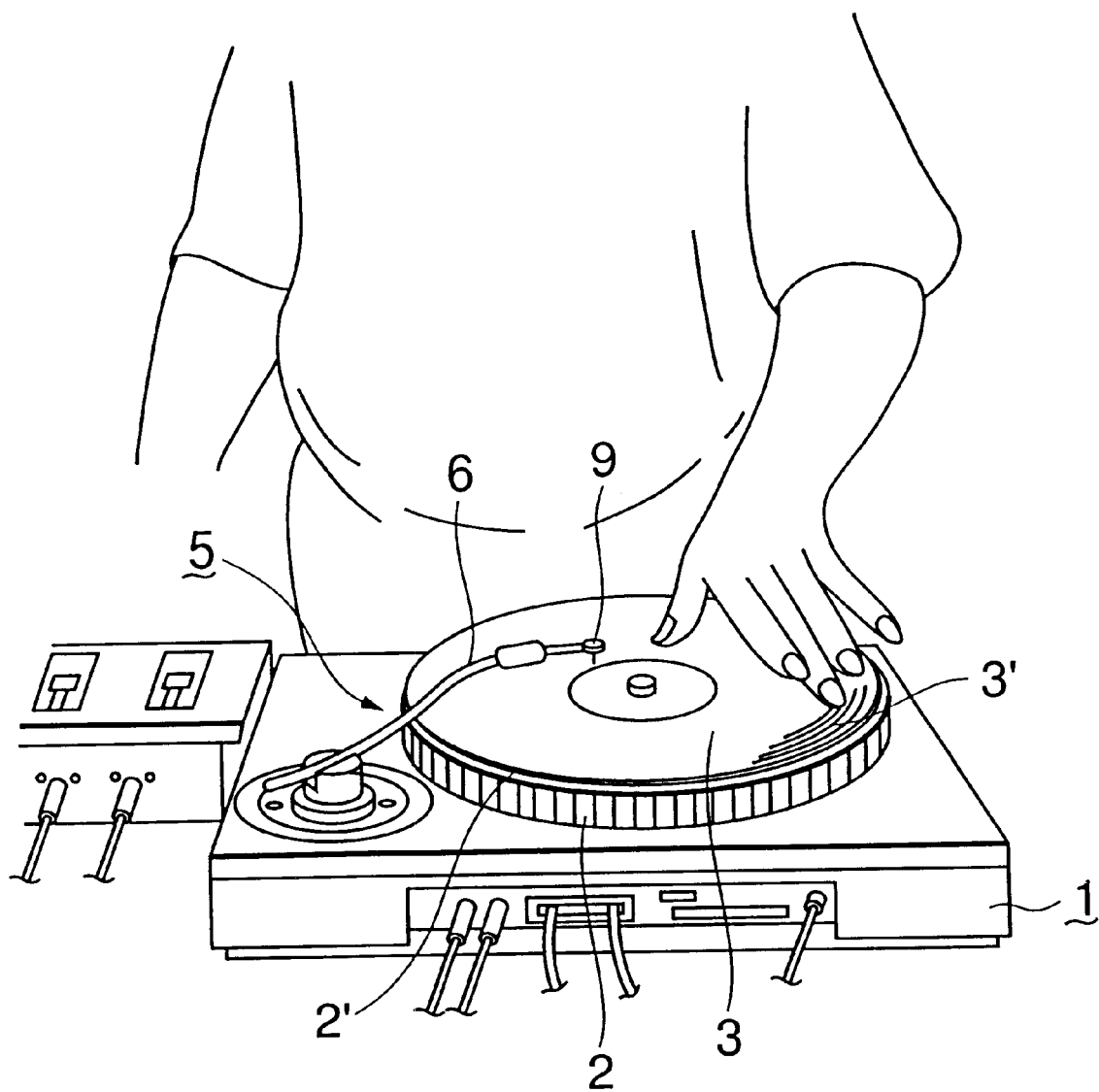
FIG. 1 is an operation explanatory drawing showing an embodiment of a DJ performance using a prior art record player for HiFi audio.
Figure 2A:
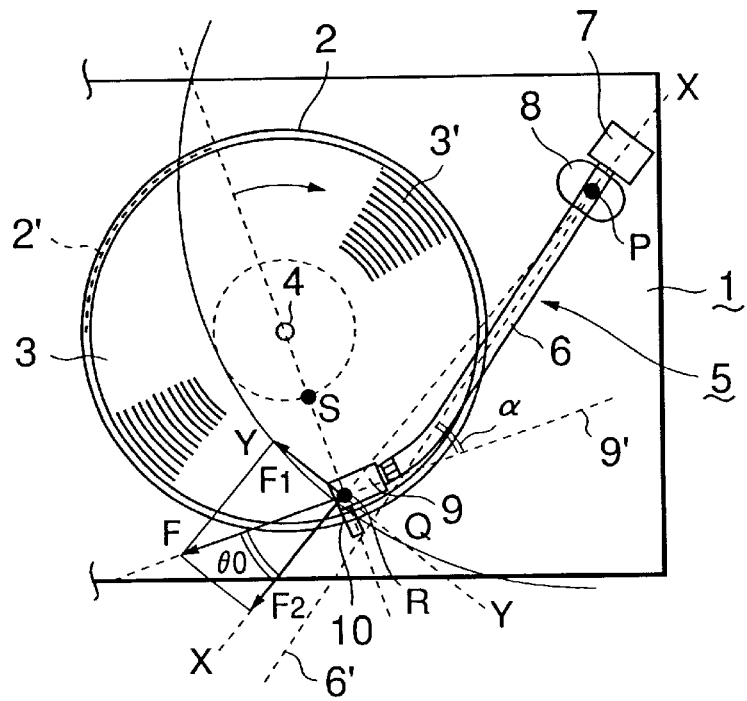
FIG. 2(A) and FIG. 2(B) are operation explanatory drawings of the prior art record player.
Figure 2B:
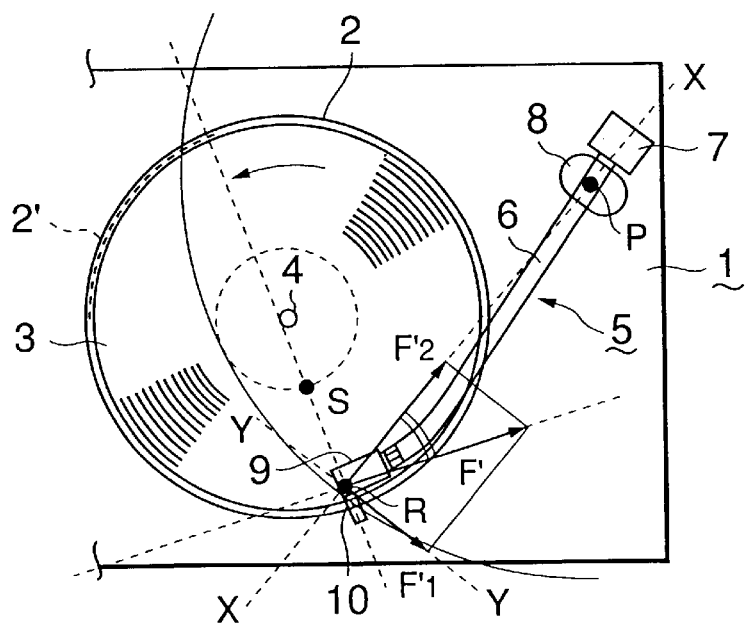

As compared with the player for HiFi audio, a first difference of the record player 1 according to the present invention lies in the structure of the tone arm 5 and the relative positional relationship between the tone arm 5 and the turntable 2 as apparent from FIGS. 2 and 3. A second difference lies in that a sliding sheet or a sliding mat 2' having a small friction coefficient is provided between the turntable 2 and a phonograph record 3. A fixing mat which consists of a rubber material having a large friction coefficient for causing no slip between these members is provided in the prior art, but the sliding sheet or mat is provided in the DJ record player 1 in order to positively rotate the phonograph record 3 in the forward/reverse direction by a finger operation.

The present invention is to define the structure of the tone arm 5 and the relative positional relationship between the tone arm 5 and the turntable 1 described above. That is, the tone arm 5 shown in the respective drawings of FIG. 3 is pivoted and supported in such a manner that the arm shaft 6 can rotate in the horizontal direction around a supporting point (rotating shaft core) P provided on a pivot portion 8. The arm shaft 6 is extended above the record groove 3' and the cartridge 9 is fixed to its one end (swiveling end). Further, the other end of the arm shaft 6 is extended from the supporting point P, and a needle pressure adjuster 7 composed of a dead weight for adjusting a needle pressure of a needlepoint 10 of the cartridge 9 is provided to this extended portion.

Here, the arm shaft 6 is not curved in the form of S as in the prior art but it is linear. In addition, as different from the example shown in FIG. 2, an offset angle α between an axial line direction 6' of the arm shaft 6 and an axial direction 9' of the cartridge 9 is zero as viewed from a plane. Therefore, the axial direction 9' of the cartridge 9 is matched with the axial line direction 6' of the arm shaft 6, and the tone arm 5 has a linear straight structure as viewed from a plane. Moreover, the arm shaft 6 has a pipe-like form and has a sufficient rigidity. For example, when the arm shaft 6 has a double structure consisting of an aluminum pipe and a brass pipe, propagation of unnecessary vibrations can be suppressed and a howling resisting performance can be improved.

When the phonograph record 3 rotates in the forward direction, a force (frictional force) $f_R$ is added to the needlepoint 10 in a tangential direction of a point R at a position of a start point R of the record groove 3' as shown in FIG. 3(A). This tangential direction has an angle difference $\theta_1$ with the axial line direction of the arm shaft 6, i.e., an X-axis direction. A component force $f_{R2}$ in the X-axis direction and an inward component force $F_{R1}$ in a direction vertical to the former, i.e., an Y-axis direction are generated by the force $F_{R1}$. As shown in FIG. 3(B), when the needlepoint 10 is positioned at the substantial intermediate point Q of the effective width of the record groove 3', the force $f_Q$ is generated. Since the supporting point P of the arm shaft 6 is arranged on the tangential line of the groove 3', the component force in the Y-axis direction which is vertical to the arm shaft 6 is zero. Further, as shown in FIG. 3(C), when the needlepoint 10 is positioned at the end point S of the groove 3', the force $f_S$ is added to the tangential direction. An angle difference $\theta_2$ is generated between the direction of the added force and the X-axis direction of the arm shaft 6 so that a component force $f_{S2}$ in the X-axis direction and an outward component force $f_{S1}$ in the Y-axis direction vertical to the former are produced.

Additionally, when the phonograph record 3 is rotated in the reverse direction, the direction and the magnitude of the force applied to the needlepoint 10 of the cartridge 9 and the respective component forces are reversed from those in the above-described forward rotation as shown in each of FIGS. 3(A), 3(B) and 3(C), and vectors indicated by the broken lines in the respective drawings can be obtained. As apparent from each drawing, the component forces in the Y-axis direction vertical to the arm shaft 6 become $f_{R1}$, and $f_{S1}$ indicated by the solid lines during the forward rotation and become $f'_{R1}$, and $f'_{S1}$ indicated by the broken lines during the reverse rotation, and they appear in the directions opposed to each other. However, when comparing the respective component forces with those obtained by using a conventional tone arm for HiFi audio (see FIG. 2), the magnitude of the component forces according to this embodiment is reduced by half or more.

In other words, in the record player 1 according to the present invention, the angle difference between the tangential direction of the record groove 3' and the axial line direction of the arm shaft 6 can be suppressed to $\theta_1$ or $\theta_2$ which is considerably smaller than $\theta_0$ in the prior art. In particular, this angle difference becomes substantially zero around the central position Q in the substantial effective width of the record groove 3'. It is thus possible to nearly completely prevent the inward and outward component forces acting on the tone arm 5 itself during the forward rotation and the reverse rotation from being increased. That is, the respective vector forces $f_{R1}$, $f'_{R1}$, $f_{S1}$ and $f'_{S1}$ can be sufficiently small. Accordingly, each vector force can not have a magnitude as large as the inward and outward vectors $F_1$ and $F'_1$ applied to the arm shaft 6 of the conventional tone arm 5 have. The needle skip phenomenon can be thus extremely effectively avoided.

FIG. 4 is an enlarged view for explaining the positional relationship between the tone arm 5 and the turntable 2 in detail. In the present invention, the start point R, the intermediate point Q and the end point S of the record groove 3' can be defined on the record center line B in the radial direction which runs through the rotating shaft core C of the turntable 2. Additionally, the tone arm 5 is positioned in such a manner that the tangential direction of the record groove 3' and the axial line direction of the arm shaft 6 coincide with each other at the intermediate point Q as viewed from a plane. The record center line B therefore becomes orthogonal to the axial line direction of the arm shaft 6 at the intermediate point Q. This means that the intermediate point Q is provided on a circumference of a virtual circle (second virtual circle) D having a distance $D_0$ between the rotating shaft cores C and P of the turntable 2 and the tone arm 5 as a diameter.

That is, the intermediate point Q implies an intermediate point dividing a distance $a_1 a_2$ of the effective width $L_0$ of the record groove 3' into halves ($L_1 = L_2 = L_0/2$), and hence a radius $R_0$ from the rotating shaft core C of the turn table 2 to the center point of the effective width is a quantity which can be univocally determined. An intersection Q of a first virtual circle W having a distance $R_0$ from the rotating shaft core C of the turntable 2 as a radius and a second virtual circle D having a distance $D_0$ between the above-mentioned rotating shaft cores C and P as a diameter becomes the intermediate point Q. Therefore, when the arm shaft 6 of the tone arm 5 is arranged on a straight line PQ running through the supporting point P of the pivot portion 8 of the tone arm 5 or on its elongation, the angle difference between the tangential direction of the record groove 3' and the axial line direction of the arm shaft 6 can be constantly suppressed to zero in the vicinity of the center of the record groove 3'. As illustrated in FIG. 3(B), this means that the inward and outward component forces applied to the tip of the arm shaft 6 become substantially zero at and around the intermediate point Q.

It is to be noted that slight forces in the directions opposed to each other are applied to the tip of the arm shaft 6 of the tone arm 5 at the start point R and the end point S of the record groove 3'. In order to further reduce the magnitudes of these component forces, the position of the virtual supporting point P of the tone arm 5 can be set sufficiently away from the position of the intermediate point Q of the groove. That is, the position of the supporting point P can be set away in such a manner that $P_1 < P_2 < P_3$ is satisfied.

There has been disclosed an example in which the angle difference between the tangential direction and the axial line direction of the tone arm 5 at the intermediate point Q of the record groove 3' is zero when selecting the relative position of the tone arm 5 with respect to the turntable 2 in the record player 1 according to this embodiment. However, the present applicant examined the state of occurrence of the needle skip phenomenon when the tone arm 5 is arranged at a position to which the straight line PQ is moved in parallel by inward and outward eccentricity from the intermediate point Q of the record groove 3'.

Consequently, as shown in FIG. 4, it has been confirmed that the needle skip phenomenon can be suppressed at a considerable rate in a region of a central effective width $a_3a_4$ ranging from a point a3 to a point a4 on a record center line obtained by dividing the effective width $a_1a_2$ of the record groove 3' on the record center line B running through the rotating shaft core C into substantially quarters in the radial direction. That is, in a region between a parallel line P'Q'running through the point $a_3$ and a parallel line P"Q"running through the point $a_4$, an experimentation was conducted by moving the pivot portion 8 of the tone arm 5 so as to move the position of the supporting point P on a parallel line B'B'parallel to the record center line B. As a result, it was revealed that the needle skip phenomenon can be notably effectively avoided with respect to the operation for the scratch performance by providing the straight type arm shaft 6 in parallel to the above-described straight line PQ when the supporting point P is in the region between the P' and the P".

Figure 5:
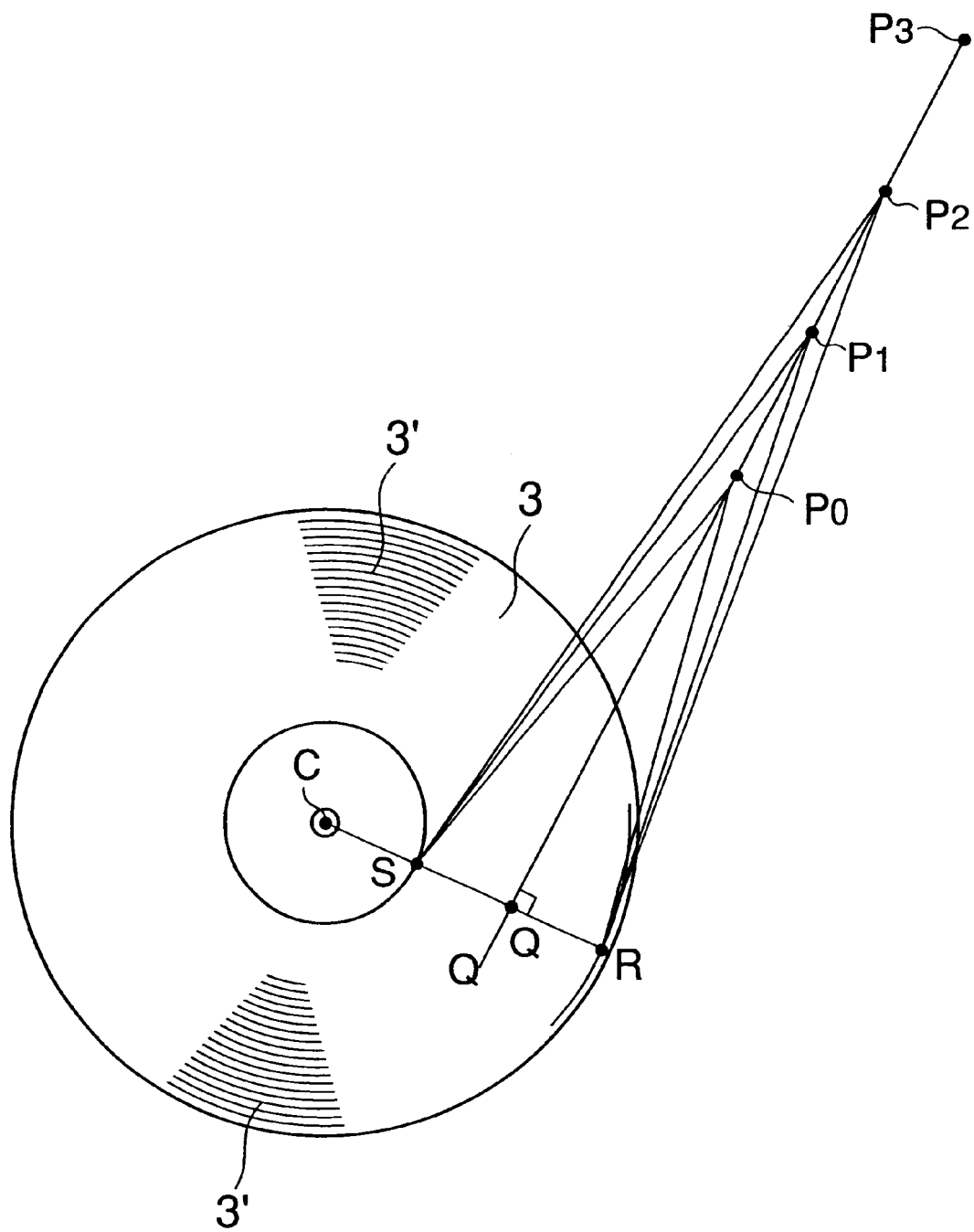
FIG. 5 is a conceptual layout drawing showing another embodiment according to the present invention.

It is to be noted that the arm shaft 6 of the tone arm 5 may be desirably sufficiently lengthened to be away from the supporting shaft P if it is provided on the straight line PQ or its elongation as shown in FIG. 5. Further, as to the position of the needle 10, it may be biased on the elongation on the Q side to some degree on the contrary. For example, there is disclosed the embodiment shown in FIG. 3 where the needlepoint 10 of the cartridge 9 is biased on an elongation of the straight line PQ connecting the intersection Q and the supporting point P on the intersection Q side to a certain extent. Therefore, the scope of the present invention can include an arbitrary modification in such a range as that a person skilled in the art can readily invent based on the technical consciousness described in "WHAT IS CLAIMED IS."

Another Embodiment

Figure 6:
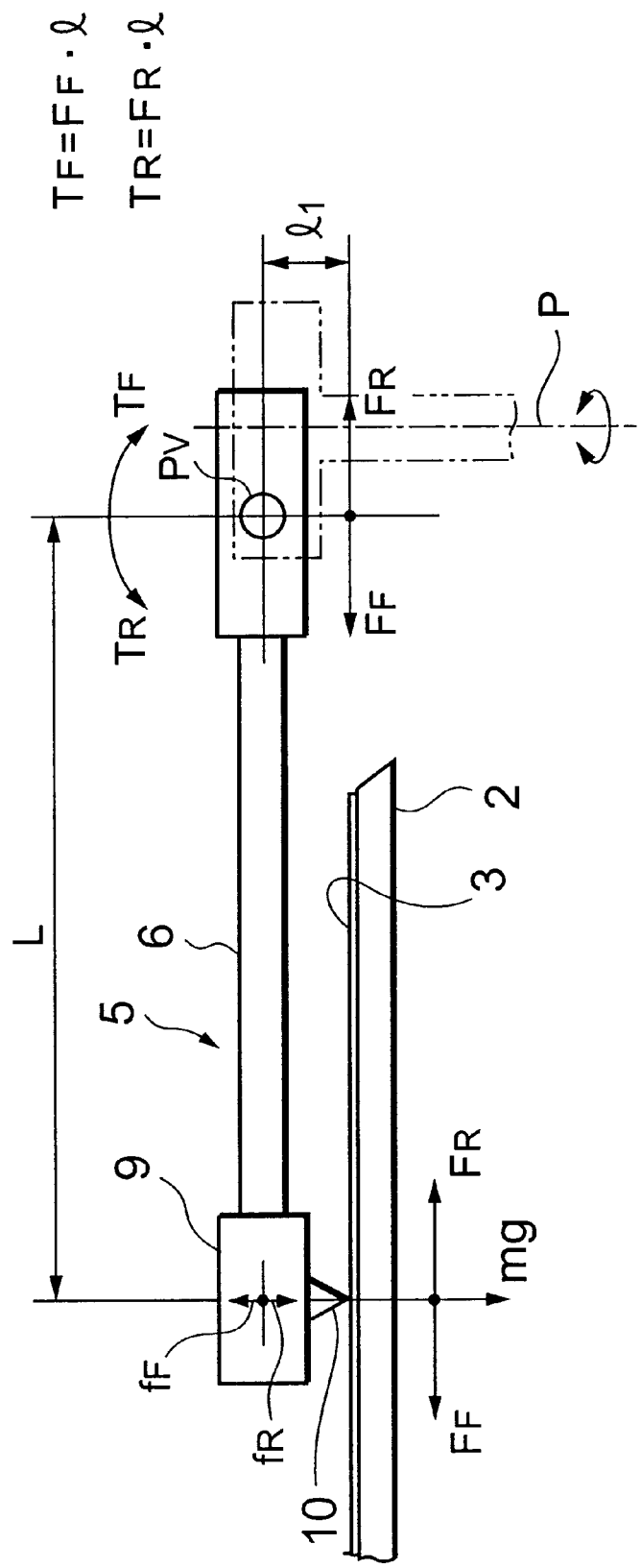
FIG. 6 is a view for explaining still another embodiment.

FIG. 6 is a view for explaining another embodiment, and FIG. 7 is a view for explaining a comparative example. Description has been given as to the position of the vertical rotating shaft core P allowing the horizontal swiveling of the arm shaft 6 in the embodiment illustrated in FIGS. 3 to 5. The actual tone arm 5 however also swivels in the up-and-down direction. In this embodiment, the effect of the embodiment illustrated in FIGS. 3 to 5 can be further enhanced by appropriately setting the position of the horizontal rotating shaft core Pv allowing the swiveling in the up-and-down direction. That is, the position of the rotating shaft core Pv is set above the needlepoint 10.

Referring to FIG. 6, it is assumed that a load applied to the needlepoint 10, i.e., a load applied to the phonograph record 3 when the phonograph record 3 remains stationary is determined as mg. To the pivot portion 8 of the arm shaft 6 are provided the rotating shaft core P allowing the horizontal swiveling of the arm shaft 6 and the rotating shaft core Pv for allowing the vertical swiveling of the same.

In this embodiment, the rotating shaft core Pv is biased toward the cartridge 9 away from P. Further, the rotating shaft core Pv is upwardly biased by $l_1$, above the height of the needlepoint 10, namely, the height of a top surface of the phonograph record 3.

In this case, when the phonograph record 3 is rotated in the forward/reverse direction, a positive frictional force $F_F$ and a negative frictional force $F_R$ act on the needlepoint 10 in the horizontal direction. These forces have the same magnitude and opposed directions. Since the directions of the forces $F_F$ and $F_R$ are biased by $l_1$ with respect to the rotating shaft core Pv, turning forces around the rotating shaft core Pv, i.e., two types of torque $T_F$ and $T_R$ are generated to the arm shaft 6. Here, $T_F=F_Fl_1$ and $T_R=F_Rl_1$.

The two types of torque $T_F$ and $T_R$ cause vertical forces $F_Fl_1/L$ and $F_Rl_1/L$ to be applied to the needlepoint 10. Here, L means a distance from the needlepoint 10 to the rotating shaft core Pv. Therefore, a force $f_F=mg-F_Fl_1/L$ is downwardly applied to the needlepoint 10 during the forward rotation. Similarly, a force $f_R=mg+F_Rl_1/L$ is downwardly applied to the needlepoint 10 during the reverse rotation.

Since the needle pressure adjuster (dead weight) is usually set in such a manner that the needle pressure $f_F$ becomes an appropriate value during the forward rotation, the needle pressure $f_R$ during the reverse rotation becomes larger than the needle pressure $f_F$ by $(F_R+F_F)l_1/L$. Thus, the needle skip during the reverse rotation can be avoided and the appropriate set needle pressure $f_F$ can be obtained during the forward rotation. Further, since the two types of torque $T_F$ and $T_R$ become zero when the rotating shaft core Pv is set to a height equal to that of the needlepoint 10, $f_F=mg$ and $f_R=mg$ can be obtained, and the needle pressures during the forward and reverse rotations can be equal, which is more preferable.

Here, the advantage of this embodiment is compared with that of the comparative example shown in FIG. 7. In the example illustrated in FIG. 7, the rotating shaft core Pv for allowing the vertical swiveling of the arm shaft 6 is positioned below the needlepoint 10 by $l_2$. In this case, the directions of the two types of torque $T_F$ and $T_R$ during the forward/reverse rotation are opposed to those depicted in FIG. 6. Therefore, the needle pressure becomes $f_F=mg+F_Fl_2/L$ during the forward rotation and becomes $f_R=mg-F_Rl_2/L$ during the reverse rotation. When the needle pressure during the forward rotation is set to an appropriate value, the needle pressure during the reverse rotation is reduced by $-(F_F+F_R) l_2/L$. It can be thus understood that the needle pressure during the reverse rotation is reduced and the needle skip tends to easily occur.

Still Another Embodiment

FIG. 8 is a view for explaining still another embodiment. FIG. 8(A) is a side view; (B), a type drawing thereof; and (C), an elevation view of the arm shaft 6 as seen from the cartridge side. In this embodiment, a dead weight 7A is provided to an elongation of the arm shaft 6 on the side of the rotating shaft core Pv. Here, the rotating shaft core Pv is arranged at a position higher than the needlepoint 10 by $l_1$ as similar to the embodiment illustrated in FIG. 6. Further, the dead weight 7A is biased to be lower than the rotating shaft core Pv. The dead weight 7A is set to have the same height as the needlepoint 10 in this embodiment.

With such an arrangement, it is possible to keep a balance in the form of a needle thread take up (balancing toy) as shown in FIG. 8(B). That is because both the needle pressure f applied to the needlepoint 10 and the dead weight 7A are lower than the rotating shaft core Pv. In this case, if the inside force $f_i$ or the outside force $f_o$ act on the needlepoint 10 as shown in FIG. 8(C), these forces $f_i$ and $f_o$ are applied in a direction for twisting the arm shaft 6. Provision of the dead weight 7A however suppresses vibrations in such a direction for twisting the arm shaft 6. Accordingly, the twist caused due to the inside component force or the outside component force described in connection with FIG. 3 can be suppressed, thereby avoiding the needle skip. That is, the needle skip can be further assuredly prevented by combining the embodiment shown in FIG. 8 with the embodiment illustrated in FIGS. 3 to 5 or that depicted in FIG. 6.

Since the present invention has such a structure as that the record player itself can suppress the needle skip phenomenon in advance even if the rotation of the phonograph record is frequently and drastically changed to the forward direction or the reverse direction by the scratch performance which is a DJ performance pattern using the record player, even a beginner having no level of skill can attain the satisfactory DJ performance as in the prior art. Accordingly, it is possible to gain the DJ performance population.

What is claimed is:

1. A record player adapted to a scratch performance operation for outputting a sound by directly rotating a phonograph record in a forward direction by a finger operation of an operator, comprising:

a turntable driven to rotate around a rotating shaft core C;

an arm shaft which is supported so as to be capable of horizontally swiveling around a rotating shaft core P positioned outside said turntable and which is positioned on a straight line connecting said rotating shaft core P and a needle for tracking a record groove of said phonograph record as viewed from a plane; and a cartridge which is held at a swiveling end of said arm shaft and detects a sound signal by said needle for tracking said record groove of said phonograph record, said rotating shaft core P of said arm shaft being positioned on a straight line orthogonal to a straight line running through said rotating shaft core C of said turntable which intersects said needle in the vicinity of a midpoint of an effective width $a_1 a_2$ of said record groove.

2. A record player according to claim 1, further comprising a sliding sheet which is provided between said phonograph record and said turntable and has a small friction coefficient at least on one side to facilitate the reverse rotation of said phonograph record.

3. A record player according to claim 1 or 2, wherein said rotating shaft core P of said arm shaft is positioned-on a straight line which is orthogonal to a straight line B running through said rotating shaft core C of said turntable and which runs through an intermediate point Q of said effective width $a_1 a_2$ of said record groove.

4. A record player according to claim 1 or 2, wherein said rotating shaft core P of said arm shaft is positioned on a straight line which is orthogonal to a straight line B running through said rotating shaft core C of said turntable and which runs between two point $a_3$ and $a_4$ for dividing said effective width $a_1 a_2$ of said record groove together with an intermediate point Q into substantially quarters in the radial direction.

5. A record player according to claim 1, wherein said rotating shaft core P of said arm shaft is positioned on a straight line which runs through an intersection Q of a first virtual circle W having a distance $R_0$ from said rotating shaft core C of said turntable to a substantial intermediate point Q in said effective width $a_1 a_2$ of said record groove as a radius and a second virtual circle D having a distance $D_0$ between the respective rotating shaft cores C and P of said turntable and said arm shaft as a diameter and which is orthogonal to a straight line B running through said rotating shaft core C of said turntable.

6. A record player according to any of claims 1 or 2, wherein a start point R and an end point S of said record groove on a straight line B running through said rotating shaft core C of said turntable and said rotating shaft core P of said arm shaft form an isosceles triangle with said rotating shaft core P as an apex.

7. A record player according to any of claims 1 or 2, wherein said rotating shaft core P of said arm shaft is provided at a position sufficiently apart from an intersection Q.

8. A record player according to any of claims 1, 2 or 5, wherein said arm shaft is elongated on the side of said rotating shaft core P and a needle pressure adjuster for adjusting a needle pressure of said needle is provided to the elongation.

9. A record player according to claim 1, wherein a rotating shaft core Pv for allowing vertical swiveling of said arm shaft is provided at a position higher than a top face of said phonograph record.

10. A record player according to claim 9, wherein said rotating shaft core Pv for allowing the vertical swiveling of said arm shaft is biased to the side of a cartridge away from said rotating shaft core P for allowing horizontal swiveling.

11. A record player according to claim 9 or 10, wherein said arm shaft is elongated to the side opposed to said cartridge from said horizontal rotating shaft core P and a needle pressure adjusting dead weight whose center of gravity is positioned to be lower than said vertical rotating shaft core Pv is provided to the elongation.

12. A record player according to claim 1, wherein said rotating shaft core P of said arm shaft is positioned on a straight line which runs through an intersection Q of a first virtual circle W having a distance $R_0$ from said rotating shaft core C of said turntable to a substantial intermediate point Q in said effective width $a_1 a_2$ of said record groove as a radius and a second virtual circle D having a distance $D_0$ between the respective rotating shaft cores C and P of said turntable and said arm shaft as a diameter and which is orthogonal to a straight line B running through said rotating shaft core C of said turntable, wherein a start point R and an end point S of said record groove on said straight line B running through said rotating shaft core C of said turntable and said rotating shaft core P of said arm shaft form an isosceles triangle with said rotating shaft core P as an apex.

13. A record player according to claim 1, wherein said rotating shaft core P of said arm shaft is positioned on a straight line which runs through an intersection Q of a first virtual circle W having a distance $R_0$ from said rotating shaft core C of said turntable to a substantial intermediate point Q in said effective width $a_1 a_2$ of said record groove as a radius and a second virtual circle D having a distance $D_0$ between the respective rotating shaft cores C and P of said turntable and said arm shaft as a diameter and which is orthogonal to a straight line B running through said rotating shaft core C of said turntable, and wherein said rotating shaft core P of said arm shaft is provided at a position sufficiently apart from said intersection Q.

* * * * *